US011604316B2

(12) United States Patent
Simpkins et al.

(10) Patent No.: US 11,604,316 B2
(45) Date of Patent: Mar. 14, 2023

(54) INTRINSIC AND TUNABLE SELF-MODULATING OPTICAL LIMITER VIA STRONG CAVITY COUPLING

(71) Applicant: The Government of the United States of America, as represented by the Secretary of the Navy, Arlington, VA (US)

(72) Inventors: Blake Simpkins, Fairfax, VA (US); Adam Dunkelberger, Alexandria, VA (US); Jeffrey C. Owrutsky, Silver Spring, MD (US); Kenan P. Fears, Alexandria, VA (US); Jeremy J. Pietron, Livermore, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 407 days.

(21) Appl. No.: 17/015,153

(22) Filed: Sep. 9, 2020

(65) Prior Publication Data

US 2021/0124122 A1    Apr. 29, 2021

Related U.S. Application Data

(60) Provisional application No. 62/924,732, filed on Oct. 23, 2019.

(51) Int. Cl.
*G02B 6/293* (2006.01)
*G02F 1/35* (2006.01)
*G02B 5/28* (2006.01)

(52) U.S. Cl.
CPC ......... *G02B 6/29395* (2013.01); *G02B 5/284* (2013.01); *G02F 1/3523* (2013.01); *G02F 2203/52* (2013.01)

(58) Field of Classification Search
CPC .... G02F 1/3521; G02F 1/3526; G02F 1/3523; G02B 5/281; G02B 5/284; G02B 6/29395
See application file for complete search history.

(56) References Cited

U.S. PATENT DOCUMENTS

| 4,861,130 A | 8/1989 | Katsuyama et al. |
| 6,768,131 B2 | 7/2004 | Rufenacht |
| 9,726,915 B2 | 8/2017 | Hutchison et al. |

OTHER PUBLICATIONS

Houdre et al., Saturation of the strong-coupling regime in a semiconductor microcavity: free-carrier bleaching of cavity polaritons, Physical Review B, Sep. 1995, pp. 7810-7813. vol. 52, No. 11, The American Physical Society, College Park, MD USA.

(Continued)

*Primary Examiner* — Christopher Stanford
*Assistant Examiner* — Journey F Sumlar
(74) *Attorney, Agent, or Firm* — US Naval Research Laboratory; Suresh Koshy

(57) ABSTRACT

An apparatus including an optical resonator, and a method of using same. The optical limiter includes an optically absorbent material. The optical resonator supports a plurality of resonant transmission peaks at resonant frequencies defined by the cavity length. The optically absorbent material exhibits a saturable absorption response at a fundamental absorption peak located spectrally at a fundamental absorption peak frequency of the plurality of resonant transmission peaks. The optically absorbent material includes an absorptivity sufficient for strong cavity coupling, such that the fundamental absorption peak splits into a first upper vibration polariton transmission peak and a second lower polariton transmission peak separated by a Rabi splitting. The Rabi splitting is proportional to a square root of the absorptivity. The absorptivity varies with optical excitation of the optically absorbent material. The absorptivity is maximized (Continued)

at a photon-unsaturated ground state, and the absorptivity is minimized at an optically excited state.

13 Claims, 10 Drawing Sheets

(56) References Cited

OTHER PUBLICATIONS

Autore et al., Boron nitride nanoresonators for phonon-enhanced nolecular vibrational spectroscopy at the strong coupling limit, Light: Science & Applications, Dec. 11, 2017, pp. 17172:1-8, vol. 7, Nature Research, Berlin, Germany.

Simpkins et al., Spanning Strong to Weak Normal Mode Coupling Between Vibrational and Fabry-Perot Cavity Modes Through Tuning of Vibrational Absorption Strength, ACS Photonics, Oct. 1, 2015, pp. 1460-1467, vol. 2, The American Chemical Society, Washington, DC, USA.

INTRINSIC AND TUNABLE SELF-MODULATING OPTICAL LIMITER VIA STRONG CAVITY COUPLING

CROSS-REFERENCE TO RELATED APPLICATIONS

This application claims the benefit of U.S. Provisional Application Ser. No. 62/924,732 filed on 23 Oct. 2019, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 108858-US2.

BACKGROUND OF THE INVENTION

Field of the Invention

This invention relates in general to a method and/or apparatus for optical communications, and in particular to a method/or apparatus for optical communications using an optical limiter.

Description of the Related Art

Modulation of optical beams (i.e., altering the intensity of a beam) finds use in many technological fields. Amplitude and frequency modulation are widely used to enhance signal-to-noise combined with phase-sensitive lock-in techniques to detect the optical beam or a signal imparted to it, such as for sensing or communication applications. Related methods are used to multiplex information transmission through application of a modulation frequency. Most pertinent to the current disclosure are ultrafast nonlinear self-modulation effects; for example, optical limiting (saturable absorption) where the transmission decreases (increases) with increasing optical fluence or intensity. Optical limiters, such as discussed at HTTPS://WWW.SCIENCEDIRECT-.COM/TOPICS/CHEMISTRY/OPTICAL-LIMITING, incorporated herein by reference, can be used to protect optical systems (detectors, optical processors, etc.) from damage incurred by optical irradiation. Important performance parameters for optical modulators include the spectral bandwidth over which they operate, the spectral region of operation (e.g., visible, UV, or infrared), the fluence required to create a modulation, and the complexity of operation. For reliability and speed, non-mechanical systems are typically preferable. Modulation of optical intensity may be realized in a number of ways including electrical control of the light source itself, biasing an electro-optic modulator (EOM) device to alter transmission or reflection response of an optical element, or altering a Bragg diffractive element via an acousto-optic modulator (AOM) device. Altering the transmission via populating excited states in a material can be accomplished in the visible regime but typically not employed in the infrared due to the high populations needed to impart a modest modulation of transmitted light. However, we show in this disclosure that, under the conditions of strong cavity coupling, infrared light modulation amplitudes measured in orders of magnitude can be achieved from shifts in resonant peak positions, as well as amplitudes, which accompany material excitation within a strongly coupled cavity-material excitation system.

A modulator exposed to broad-band illumination (e.g., white light) may also serve as a tunable source of light if it transmits or reflects a narrow band of wavelengths. When acting as a tunable source, a modulator can, in principle, serve in molecular sensing applications if its wavelength can be tuned to optical absorptions characteristic of the analyte (i.e., chemical of interest), as in optical absorption spectroscopy and infrared absorption spectroscopy ("IRAS"). This is particularly relevant for our system which can operate in the infrared vibrational fingerprint region. Field-capable or remote sensing IRAS spectrometers are hampered by the paucity and small tuning range of available sources or their cumbersome power requirements (e.g., quantum cascade lasers).

Electro-optic modulators, which are standard tools for beam modulation, do not operate in the common molecular fingerprint region of the infrared (i.e., $\lambda \sim 3$-$7$ μm) and those that extend into the near infrared (i.e., $\lambda \sim 1$-$2$ μm) operate orders of magnitude slower (~10 ns) than an embodiment of the instant invention (~0.0001 ns) described below. Acousto-optic modulators can operate further into the mid-infrared region but provide even slower response (~100 ns). Liquid crystal modulators can provide appealing optical properties (low scattering losses and high optical contrast), but even liquid crystal systems described as "ultra-fast" operate ~9 orders of magnitude more slowly than an embodiment of the instant invention described below.

BRIEF SUMMARY OF THE INVENTION

An embodiment of the invention utilizes optical cavities strongly coupled to material excitations and exhibits spectral transmission features that depend on the material's excitation level.

One or more of the embodiments of the invention described herein offer several advantages over established technologies for optical modulation. For example, it can operate at fast timescales. If vibrations are used as the cavity-coupled material resonance, response time is only limited by the inverse of the vibrational linewidth, also known as the dephasing time. For example, an embodiment of the invention includes a triggered response (i.e., having a 2-beam operation) on the single picosecond timescale (on the order of $10^{-12}$ s; terahertz) and also has exhibited a single beam mode of operation on the ~100 femtosecond timescale (on the order of $10^{-13}$ s; 10's terahertz). Recovery time for such devices occurs on a timescale determined by vibrational population lifetime (e.g., 1-100s picoseconds). As another example, if electronic or visible regime material resonances serve as the cavity-coupled material resonance, device response may not be quite so fast, but one or more embodiments of the invention support large spectral tunability (i.e., 100's of meV). The transmission spectrum of the strongly coupled cavity can be tuned, either before operation or in real time, by modifying the concentration of the cavity-coupled material resonance filling the cavity. This enables real-time adjustment of the operational parameters of the modulator (e.g., operating wavelength, optical modulation depth).

An embodiment of the invention includes an apparatus. The apparatus includes an optical limiter. The optical limiter includes an optical resonator. The optical resonator includes a saturable optically absorbent material. The optical resonator supports a plurality of resonant transmission peaks at resonant frequencies defined by the cavity length and the refractive index of the material therein. The saturable optically absorbent material behaves as a saturable absorber (i.e., its absorbance is a function of illumination intensity). The saturable optically absorbent material includes a fundamental absorption peak located spectrally at a fundamental absorption peak frequency of the plurality of resonant transmission peaks. The optically absorbent material includes an absorptivity sufficient for strong cavity coupling, such that the fundamental absorption peak splits into a first upper vibration polariton transmission peak and a second lower polariton transmission peak separated by a Rabi splitting. The Rabi splitting is proportional to a square root of the absorptivity. The absorptivity varies with optical excitation of the optically absorbent material. The absorptivity is maximized at a photon-unsaturated ground state, and the absorptivity is minimized at an optically excited state.

An embodiment of the invention includes a method. The method includes limiting an optical intensity of a transmitted optical signal from an optical source using an optical resonator. The optical resonator includes an optical mode, a cavity length, and an optical limiter located spatially within the optical mode. The optical limiter includes an optically absorbent material. The optical resonator supports a plurality of resonant transmission peaks at resonant frequencies defined by the cavity length. The saturable optically absorbent material includes a fundamental absorption peak located spectrally at a fundamental absorption peak frequency of the plurality of resonant transmission peaks. The optically absorbent material includes an absorptivity sufficient for strong cavity coupling. The absorptivity varies with optical excitation of the optically absorbent material. The absorptivity is maximized at a photon-unsaturated ground state, and the absorptivity is minimized at an optically excited state.

DETAILED DESCRIPTION OF THE INVENTION

Figure 1:
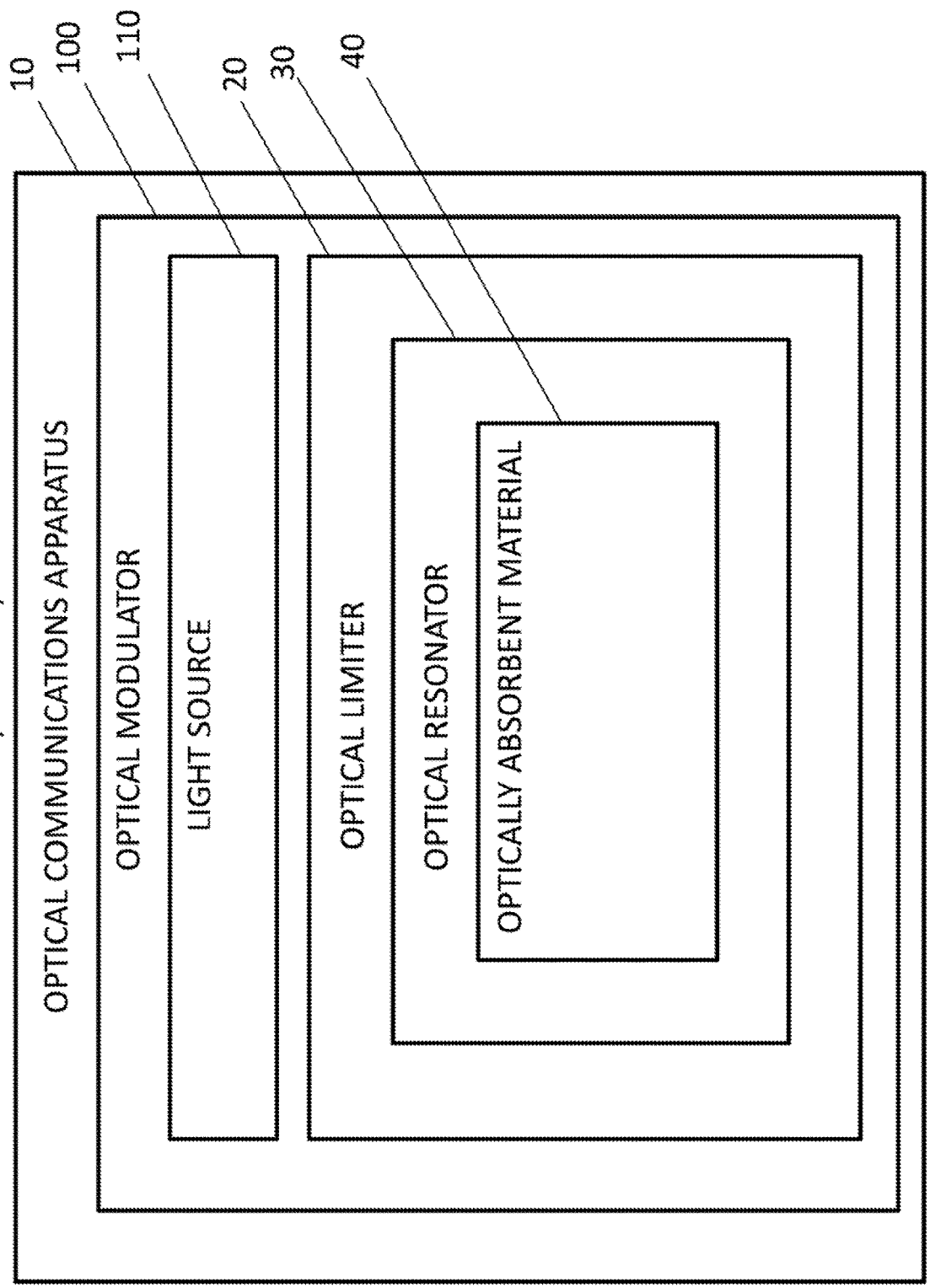
FIG. 1 is a block diagram of an apparatus according to an embodiment of the instant invention.
Figure 2:
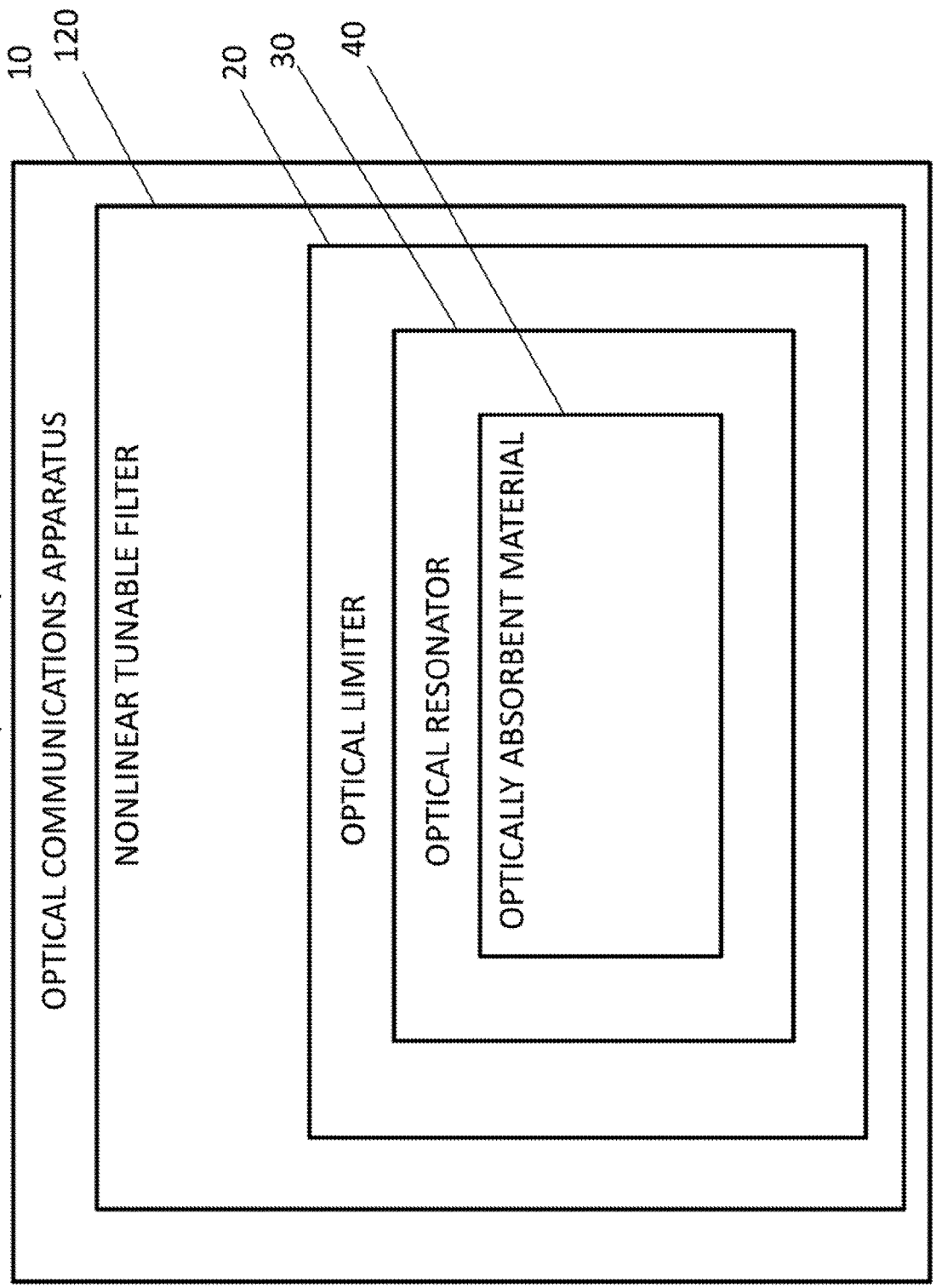
FIG. 2 is a block diagram of another apparatus according to an embodiment of the instant invention.
Figure 3:
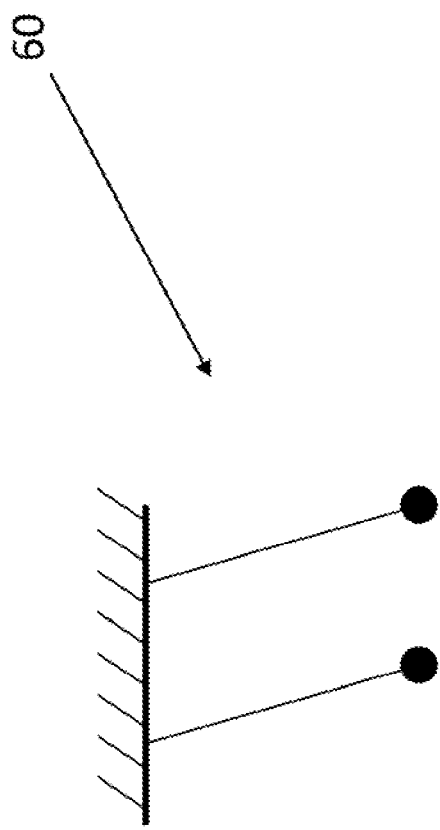
FIG. 3 is an uncoupled pendulum system, provided for analogical purposes.
Figure 4:
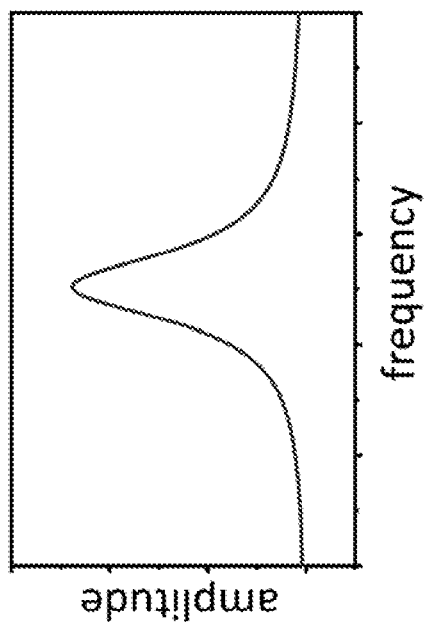
FIG. 4 is an illustrative graph representing the behavior of the uncoupled pendulum system, provided for analogical purposes.
Figure 5:
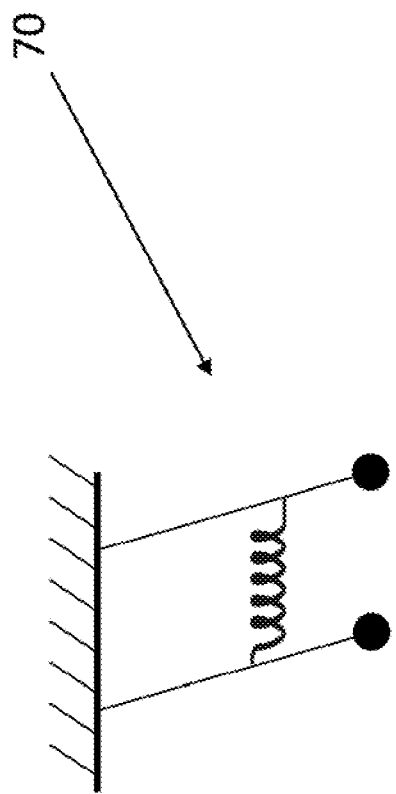
FIG. 5 is a coupled pendulum system, provided for analogical purposes.
Figure 6:
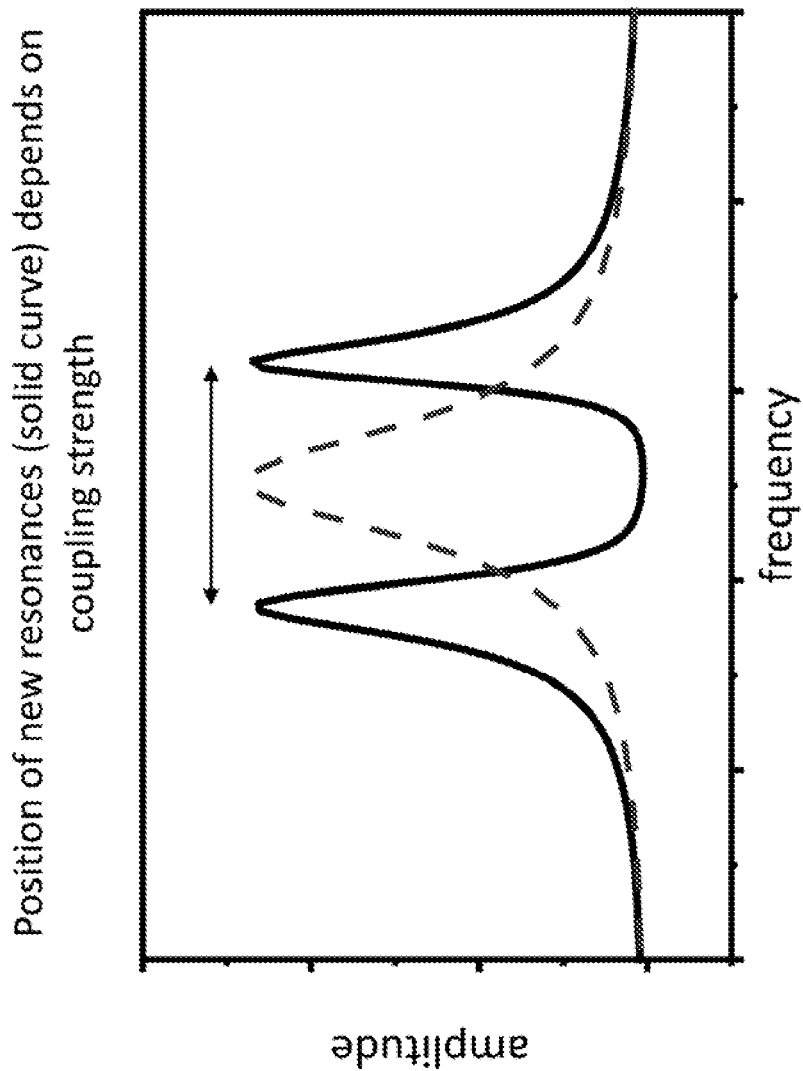
FIG. 6 is an illustrative graph representing the behavior of the coupled pendulum system, provided for analogical purposes.

An embodiment of the invention includes an apparatus 10. The apparatus 10 includes an optical modulator 100. The optical modulator 100 includes an optical limiter 20. The optical limiter 20 includes an optical resonator 30. The optical resonator 30 includes an optical mode, a cavity length, and a saturable optically absorbent material 40 located spatially within the optical mode. For the purpose of this patent application, "optical mode" is a term of art, and is defined herein as a standing light wave supported by the optical resonator at its resonant frequencies. The optical resonator 30 supports a plurality of resonant transmission peaks at resonant frequencies defined by the cavity length and index of refraction of the material within the resonator. The optically absorbent material 40 exhibits a saturable absorption (i.e., the absorption is a function of incident illumination intensity) at a fundamental absorption peak located spectrally at the same frequency as one of the plurality of resonant transmission peaks of the optical resonator 30. In other words, the optically absorbent material 40 exhibits a strong absorption, and that absorption changes with incident optical intensity. For the purpose of this patent application, "fundamental absorption peak" is a term of art, and is defined herein as a peak in the optical absorption spectrum that is observed when the material is in its ground state and is probed outside of any etalon or cavity structure. For the purpose of this patent application, "fundamental energy" is a term of art, and is defined herein as the energy at which the fundamental absorption peak occurs. The fundamental absorption peak of the optically absorbent material is due to a vibrational absorption band that absorbs infrared radiation and induces a transition between vibrational states. In other words, the fundamental energy the energy position of this absorption feature. When the material is not excited (i.e. a photon-unsaturated ground state), its absorption at the fundamental energy is maximized resulting in very low transmission at the fundamental energy. When the absorbent material is in an optically excited state, the optically absorbent material becomes less absorptive at the fundamental energy (this being the behavior of a saturable absorber), which results in increased transmission at the fundamental energy. For the purpose of this patent application. "vibrational absorption" is a term of art and is defined herein as a transition between vibrational energy states (e.g., bond stretching). The optically absorbent material 40 includes an absorptivity sufficient for strong cavity coupling, such that the fundamental absorption peak splits into two peaks referred to as an upper vibration polariton transmission peak and a lower polariton transmission peak. These two peaks are separated by a Rabi splitting. For the purpose of this patent application, "absorptivity" is a term of art and is defined herein as the amount of radiation absorbed per unit length of the optically absorbent material 40.

Figure 7:
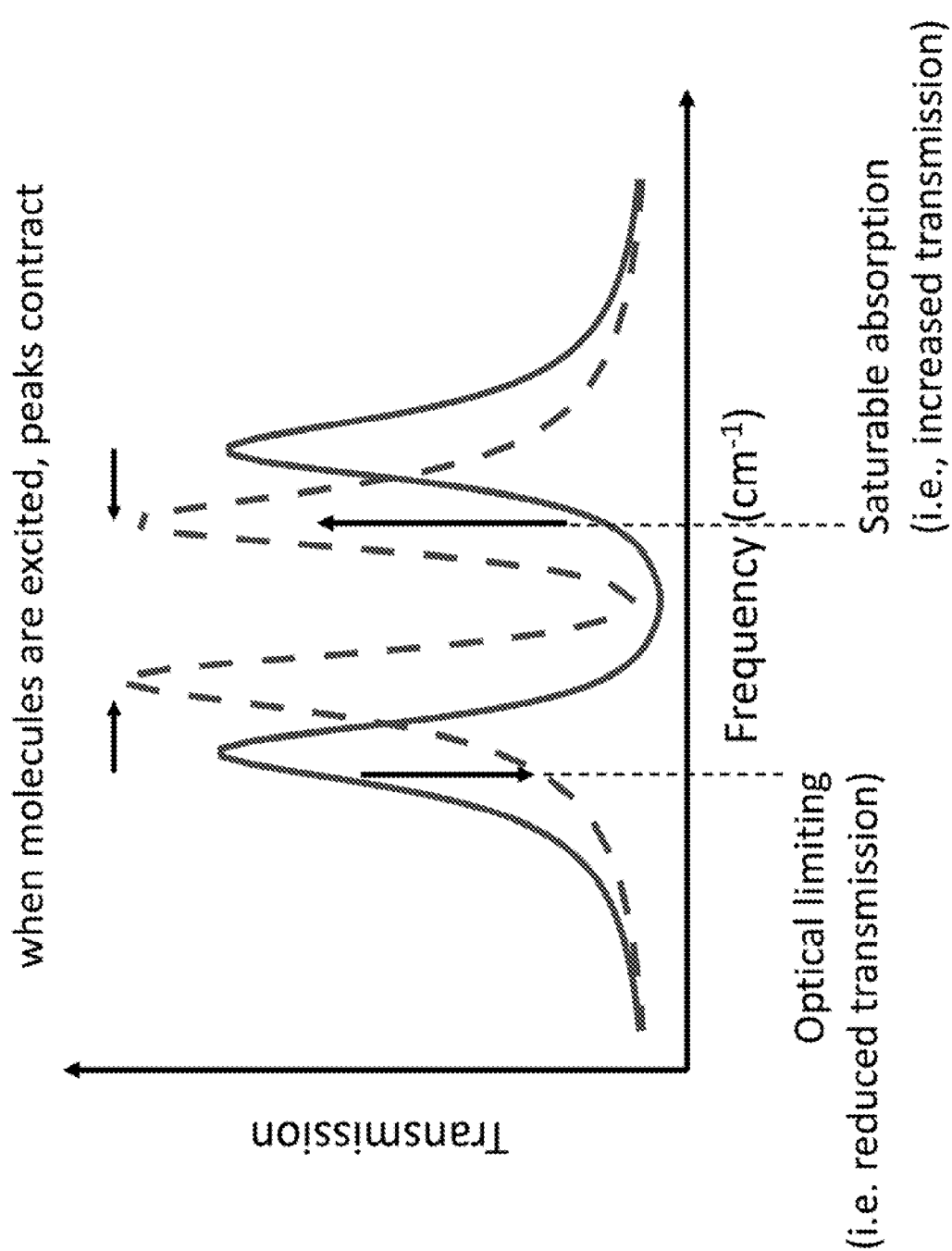
FIG. 7 is an illustrative graph representing the behavior of an embodiment of the instant invention.

For the purpose of this patent application, "strong cavity coupling" or "strong coupling" are terms of art and are defined herein as the phenomenon by which the optical mode of the optical resonator interacts with the fundamental absorption peak of the optically absorbent material to create two new optical modes, the upper polariton and lower polariton, separated in frequency by an amount larger than either the optical mode bandwidth or the fundamental absorption peak bandwidth. With reference to FIGS. 3-6, implications of strong coupling can be understood by looking at two pendulums which are model oscillators. An uncoupled pendulum system 60 including two independent oscillators, such as shown by way of example in FIG. 3, with the same resonance frequency, will oscillate freely at that frequency, such as shown by way of example in the illustrative graph of FIG. 4. But, if the oscillators are "coupled" by a spring, such as shown by way of example in FIG. 5, such a coupled pendulum system 70 will exhibit two new resonant frequencies separated from the original, such as shown by way of example in the illustrative graph of FIG. 6. The positions of these new resonances depend on the coupling strength. The instant invention, of course, does not include actual pendulums. Rather, instead of two pendulums, the two oscillators are (i) molecular vibrations and (ii) the optical resonator 30 in the instant invention. Nevertheless, these molecular vibrations cooperating with the optical resonator 30 give rise to two resonant transmission peaks whose positions are a function of coupling strength. This coupling strength is reduced when the molecules become excited, causing the two peaks to move toward one another, as shown by way of example in the graph of FIG. 7. Modulation of coupling strength results in regions of reduced transmission (i.e., optical limiting) and other spectral regions exhibiting increased transmission (i.e., saturable absorption). The separation of the two resonant transmission peaks depends on the absorptivity of the optically absorbent material and, thus, the concentration of ground state molecules. Optical excitation of the molecules promotes them out of the ground state and reduces peak separation. Decreased transmission at certain frequencies leads to optical limiting, as discussed below, and increased transmission at other frequencies leads to saturable absorption, as also discussed below.

For the purpose of this patent application, "Rabi splitting" is a term of art and is defined herein as the frequency separation between the first upper vibration polariton transmission peak and the second lower vibration polariton transmission peak. The Rabi splitting is proportional to a square root of the absorptivity. The absorptivity varies with optical excitation of the optically absorbent material 40 such that the absorptivity is maximized at a photon-unsaturated ground state, and the absorptivity is minimized at an optically excited state.

Optionally, the apparatus 10 further includes an optical modulator 100. The optical modulator 100 includes the optical limiter 20 and a standard light source 110 in optical communication with the optical limiter and configured to transmit an optical signal. The light source 110 and the optical limiter 20 cooperate to alter the Rabi-splitting, thereby to alter frequencies of the upper vibration polariton transmission peak and the lower polariton transmission peak.

Optionally, the apparatus 10 further includes a nonlinear tunable filter 120. The nonlinear tunable filter 120 includes the optical limiter 20. The nonlinear tunable filter 120 is configured to modify the Rabi-splitting. In other words, the nonlinear tunable filter 120 operates by modifying the Rabi-splitting, which shifts the frequency of transmitted or reflected light.

Optionally, the optical resonator 30 consists of a standard etalon optical cavity, a standard nanofabricated resonator, a plurality of standard metallic spheres, a plurality of standard nanostructures, a standard whispering gallery resonator, or a standard structured surface phonon polariton material. For example, etalon optical cavities amenable for use in this embodiment of the invention are described in U.S. Patent Application Publication No. 2014/0102876 to Hutchinson et al., incorporated herein by reference. For example, the optical resonator 30 includes a standard thin-film Fabry-Perot cavity. Such a Fabry-Perot cavity, for example, includes two metal mirrors separated by 1-100 µm and sandwiching a spin-coated, standard polymer including the embedded molecules of interest (i.e., molecules that exhibit strong absorption and saturable absorption response). As another example, the optical resonator 30 includes liquid solutions housed between mirrors (e.g., a standard Harrick flow cell).

Optionally, the apparatus further includes a switch comprising the optical limiter 20 to shift one of the two resonant transmission frequency peaks, thereby affecting the transmission of a signal beam.

Optionally, the fundamental absorption peak is located in an infrared regime. The saturable optically absorbent material includes an infrared saturable optically absorbent material.

An embodiment of the invention includes a method 10. The method 10 includes limiting an optical intensity of a transmitted optical signal from a standard optical source using an optical limiter 20. The optical limiter 20 includes an optical resonator 30. The optical resonator 30 includes an optical mode, a cavity length, and a saturable optically absorbent material 40 located spatially within the optical mode. For the purpose of this patent application, "optical mode" is a term of art, and is defined herein as a standing light wave supported by the optical resonator at its resonant frequencies. The optical resonator 30 supports a plurality of resonant transmission peaks at resonant frequencies defined by the cavity length and index of refraction of the material within the resonator. The optically absorbent material 40 exhibits saturable absorber characteristics at a fundamental absorption peak located spectrally at the same frequency as one of the plurality of resonant transmission peaks of the optical resonator 30. The optically absorbent material 40 includes an absorptivity sufficient for strong cavity coupling. The optically absorbent material 40 includes an absorptivity that varies with optical excitation intensity. The absorptivity is maximized at a photon-unsaturated ground state, and the absorptivity is minimized at an optically excited state.

Optionally, the limiting an optical intensity of a transmitted optical signal from an optical source using an optical resonator 30 includes the following. The fundamental absorption peak is Rabi-split into an upper vibration polariton transmission peak and a lower polariton transmission peak. The Rabi splitting is proportional to a square root of the absorptivity. The optical signal from the optical source is at the same frequency as one of the upper polariton transmission peak or lower polariton transmission peak. The Rabi splitting is varied to spectrally shift the upper polariton transmission peak and the lower polariton transmission peak so that the transmission at the frequency of the optical source is reduced.

Optionally, the method further includes shifting upper vibration and lower vibration polariton spectral positions by changing the absorptivity. Optionally, the shifting of the upper vibration and lower vibration polariton spectral positions by changing the absorptivity of the optically absorbent material includes optically exciting the optically absorbent material, applying a voltage bias to the optically absorbent material, or adjusting the absorbing material concentration by flowing a solution into the cavity that has a desired concentration;

Optionally, the optical signal includes a broadband signal. The broadband signal includes a bandwidth spanning the upper vibration polariton transmission peak and the lower polariton transmission peak. The transmission spectrum of the optical limiter is modified by varying the intensity of the broadband signal. The optical intensity of the optical signal is increased so as to shift upper vibration and lower vibration polariton resonances toward the fundamental absorption energy located in between the first upper vibration polariton transmission peak and the second lower polariton transmission peak. The optical intensity is decreased so as to shift the upper vibration and lower vibration polariton frequencies away from the fundamental absorption energy located in between the first upper vibration polariton transmission peak and the second lower polariton transmission peak.

Optionally, the optical signal includes a narrowband signal. The narrowband signal includes an optical source at a frequency that corresponds to either the upper vibration polariton transmission peak or the lower polariton transmission peak. The limiting of the optical intensity of an optical signal from an optical source using an optical limiter comprises transmitting the optical signal, when the optical intensity is below a saturation fluence of the optically absorbent material, or blocking the optical signal, when the optical intensity is above the saturation fluence of the optically absorbent material. For the purpose of this patent application, "saturation fluence" is a term of art and is defined herein as the incident fluence that reduces the absorptivity of the saturable optically absorbent material to one half its value measured with minimal excitation.

Optionally, the optical signal includes a linearly polarized optical signal. The limiting the optical intensity of an optical signal from an optical source using an optical limiter includes modulating light with a same linear polarization as the linearly polarized optical signal, and not modulating the light with linear polarization orthogonal to the linearly polarized optical signal.

Another embodiment of the invention is described as follows. Optical filters are used to alter the spectral transmission or radiation of a device. Etalon-type optical cavities (i.e., two mirrors separated by a gap) exhibit transmission peaks (i.e., regions of high transmissivity) associated with resonant modes of the cavity which occur for wavelengths satisfying the following condition, L=m*n*λ/2, where L is the cavity length, λ is the radiation wavelength, n is the index of refraction of the material in the cavity, and m is an integer. When the cavity is empty or contains no absorbing media, this well-known and understood phenomenon results in a series of transmission peaks, each with a fundamental wavelength, $\lambda_m$, that satisfies the condition above for a specific integer value of m. Transmission is dramatically changed when the cavity is filled with a material whose absorption (i) coincides with one of these resonant fundamental wavelengths, (ii) is strong enough to result in, what is termed, strong cavity coupling and has a width similar to the cavity transmission band. Under strong coupling conditions, the material absorption and the resonant mode of the cavity hybridize to form two new modes, resulting in two resonant transmission peaks, as opposed to one. These two transmission peaks, referred to as polaritons, appear at frequencies bracketing the original material absorption frequency. The original material absorption frequency is termed for the purpose of this patent application as a fundamental absorption peak. That is, the upper polariton appears at a higher frequency, which is termed for the purpose of this patent application as a first upper vibration polariton transmission peak; the lower polariton appears at a lower frequency, which is termed for the purpose of this patent application as a second lower polariton transmission peak. Their spectral positions depend on detuning or spectral mismatch between the optical and material resonances and the magnitude of the coupling strength, $$\Omega_T = \sqrt{\frac{\alpha_0 \Gamma_H}{2\pi n_B}},$$

which scales with the square root of absorber concentration ($\alpha_0$ is the absorption strength, which is the product of the concentration c and the absorption coefficient α, i.e., $\alpha_o = c*\alpha$). This phenomenon is graphically described by way of example in FIG. 6. If the absorption strength of the material is reduced, the separation between the polariton modes is commensurately reduced, up to the point where only the original cavity mode appears in the transmission spectrum. Therefore, modifying the absorption of a material that is strongly coupled to a cavity, causes the spectral positions of the polaritons (i.e., resonant transmission peaks) to change. Vibrational resonances can be strong enough absorbers to allow for strong cavity coupling and have excited state populations that can be modified on ultrafast timescales enabling modulation of the polariton frequencies. Two illustrative schemes for optical modulation are described below.

I. Optical Self-Modulation Scheme

If a beam incident on the strongly coupled cavity spectrally overlaps either polariton mode or the uncoupled fundamental frequency, molecular excitation will occur. This excitation may occur directly, through photon absorption into the material reservoir (this occurs when the incident photons are at the uncoupled material excitation frequency), or indirectly, by exciting at either polariton frequency. These excitations will eventually decay into reservoir material excitations and back into the ground state but strong optical modulation can occur before these relaxations. Crucially, molecular vibrations are anharmonic, so the excited molecules no longer absorb at the resonant frequency of the cavity and therefore, no longer contribute to cavity coupling. In this way, vibrational absorbers exhibit saturable absorption. Because of this property, exciting the molecules results in a shifting of the resonant polariton transmission peaks toward the fundamental frequency, which results in reduced transmission at the original polariton frequencies and increased transmission at the fundamental frequency. With high enough excitation levels, such that molecules are excited mom quickly than they can relax, and cavity quality factors, the transmission at the original polariton positions can be brought essentially to zero, thus resulting in a single beam optical self-limiter. Conversely, the transmission at the fundamental frequency experiences the opposite effect where increased excitation results in increased transmission.

II. Two-Beam Scheme Scheme

Another embodiment of the invention includes a triggered, two-beam system can also be envisioned. The simplest case would be an excitation, or trigger, beam at the fundamental frequency that modulates the transmission of a beam at either polariton frequency. A more sophisticated system could take advantage of the energy relaxation pathways present in the material. To modulate a specific vibration-cavity coupled system, one could use a laser pulse to excite an electronic state or higher-lying vibrational state of the material. This excitation can then decay, through understood processes like internal conversion and intramolecular vibrational relaxation, in such a way that the excited state of the coupled vibrational mode ends up being populated, modulating the polariton positions. In this way, one could modulate the transmission (reduce it at the polaritons and increase it at the fundamental frequency) via excitation of a higher energy material excitation. An example of such a system is provided in Weidinger, D., Brown, D J., and Owrutsky, J. C., Transient Absorption Studies of Vibrational Relaxation and Photophysics of Prussian Blue and Ruthenium Purple Nanoparticles, J. Chem. Phys., 134, 124510 (2011), incorporated herein by reference; this example is Prussian blue, where excitation in the visible is quickly followed by an electron back transfer leaving the cyano group vibrational band in an excited state. With a cavity tuned to this CN vibrational mode and energy transfer from the visible electronic excitation to the CN vibration, another embodiment of the invention provides modulated infrared transmission via excitation in the visible.

Electrical Tuning of the Modulation Capability

Figure 8:
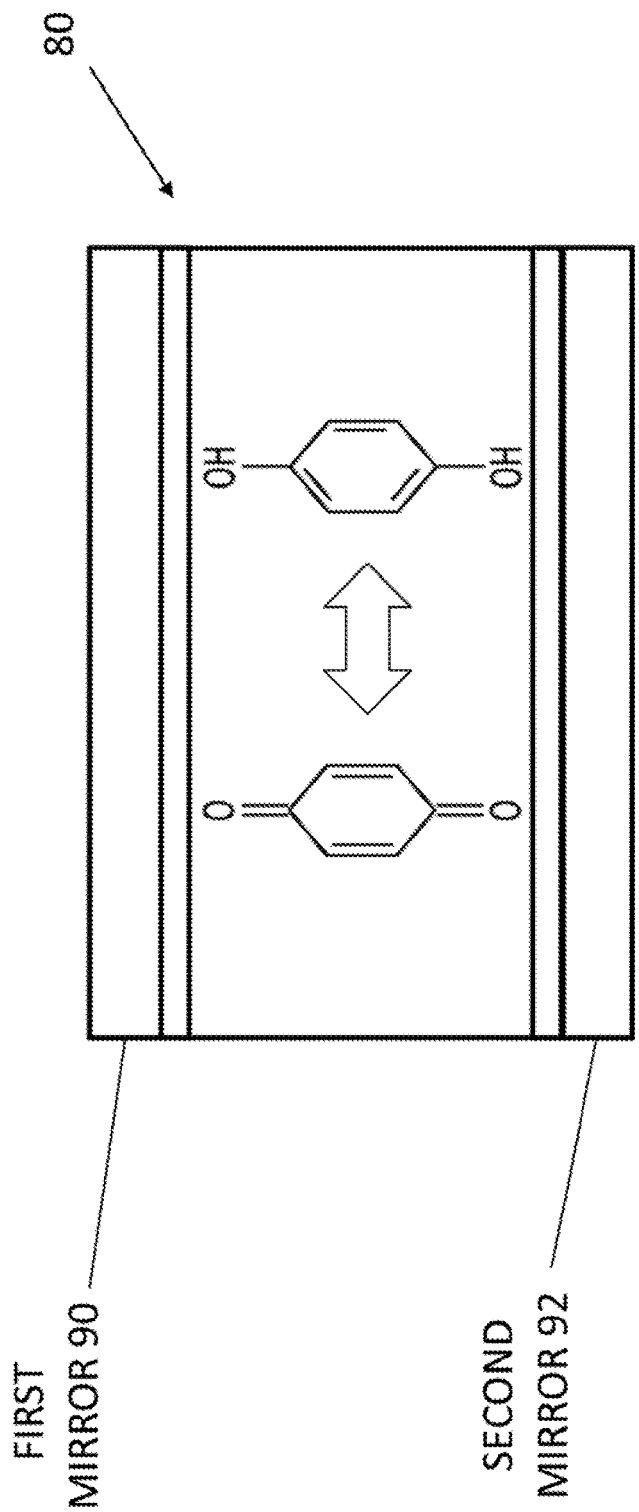
FIG. 8 is a schematic cross-section of an optical cavity according to an embodiment of the instant invention.
Figure 9:
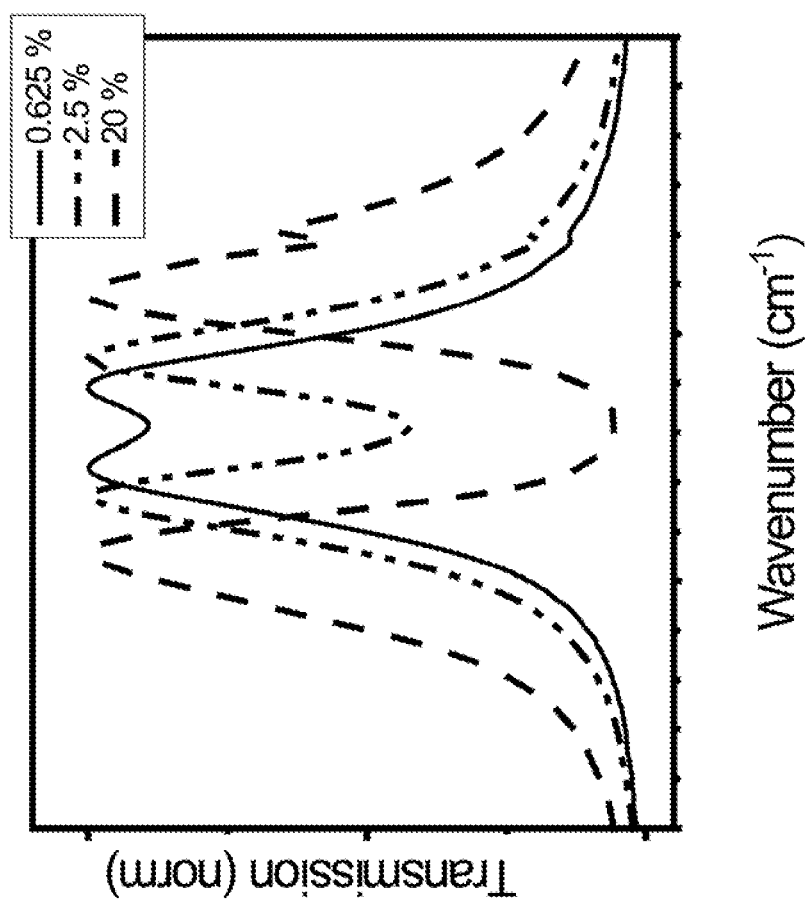
FIG. 9 is a graph of transmission spectra for varying concentrations of saturable optically absorbent material present in the cavity, which demonstrates how a device could be tuned to modulate a desired spectral region.
Figure 10:
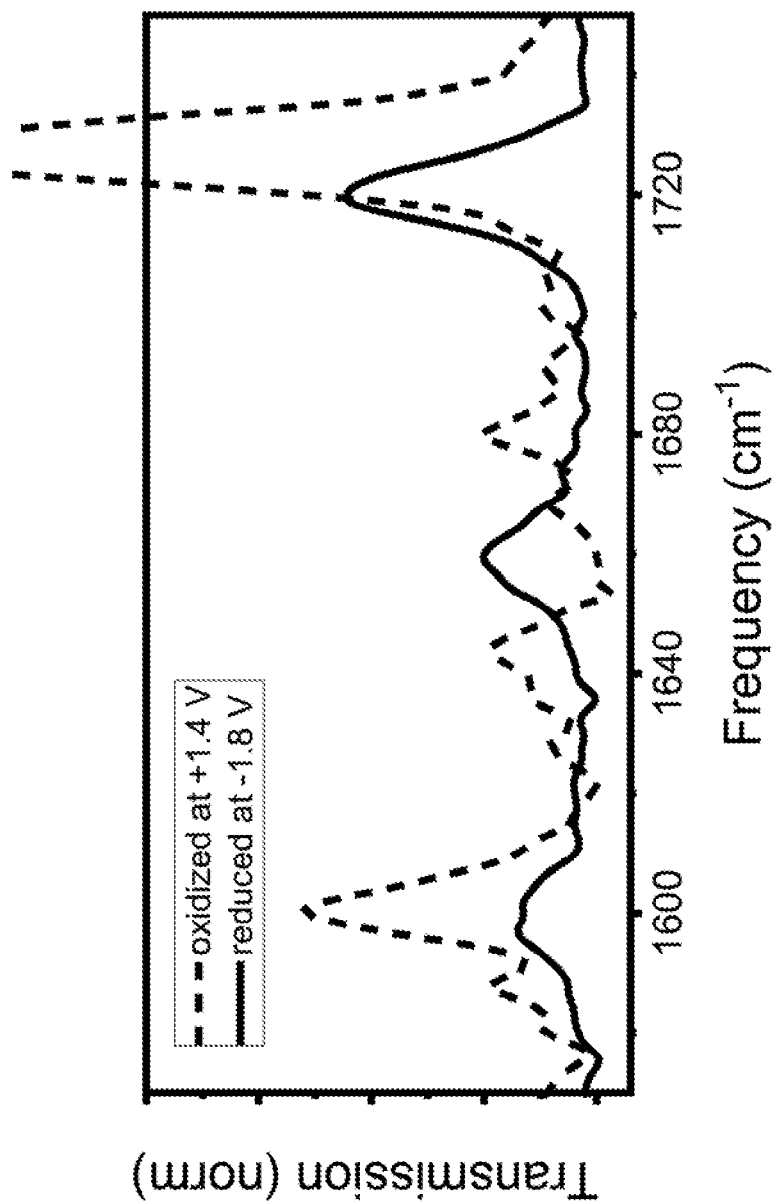
FIG. 10 is a graph of electrochemical switching between strong coupling conditions and no coupling.

FIG. 8 shows a schematic of an embodiment of the instant invention. In this embodiment, optical resonator 20 includes a Fabry-Perot optical cavity 80. The optical cavity 80 includes mirrors 90, 92. The optical cavity 80 houses a standard solution of molecules whose optical absorption can be cycled electrochemically (e.g., benzo to dihydroquinone system). FIG. 9 shows transmission spectra for varying concentrations of absorbing material present in the cavity, which demonstrates how a device could be tuned to modulate in a desired spectral region. FIG. 10 shows a graphical demonstration of electrochemical switching between strong coupling conditions (dashed) when all the molecules are in their oxidized condition and no coupling (solid) when all the molecules are chemically reduced. Transmission at ~1655 cm is modulated by a factor of more than 30.

Because the modulation capabilities (i.e., magnitude and spectral position of operation) depend on the strength of cavity coupling, any means by which one can exert control over coupling strength could be used to tune the device operation. Optical approaches are described above (i.e., an optical beam excites the material with the resulting ground state bleach leading to weaker coupling and transmission modulation). Electrostatic reorientation of molecular dipoles has been shown to alter molecule-cavity coupling since coupling depends on transition dipole orientation. Another approach using electrical stimulus is described as follows. Again, the coupling strength depends on the concentration of absorbers in the cavity. If electrochemical switching is used to alter the absorber concentration, it would modify the coupling strength and thereby change the splitting and alter the position of the resonant polariton transmission peaks. As an example, referring to FIG. 9, benzoquinone has a strong infrared absorption associated with a carbonyl species in the molecule. Strong coupling can be achieved between this carbonyl vibrational resonance and an optical cavity. The strength of this coupling (i.e., the position of the resonant polariton transmission features) scales with the square root of carbonyl concentration. If we then decrease the concentration of the carbonyl species, through electrochemical reduction of benzoquinone to dihydroquinone at a sufficient negative bias, the polaritons will contract toward the fundamental resonance frequency. This phenomenon can be utilized in two fashions. First, electrochemical cycling can be used to directly modulate the transmission spectrum of a cavity coupled system which would constitute an actively tunable filter, albeit, with somewhat slow operation (~seconds). Secondly, one could use this as an ultrafast modulator, operating as described in preceding sections, but with tunable operational specifications. Electrochemical modulation tunes the spectral region of operation, since the polariton features can be moved, and can alter the magnitude of optical modulation at frequencies of interest. Furthermore, if one or both of the cavity mirrors are formed with conductive layers (e.g., Au or other reflective metal), that mirror coating can serve as an electrochemical working electrode and used to drive the electrochemical cycling.

Polarization Filter

Molecules absorb the trigger pulse described above only when the electric field of the pulse is aligned with the transition dipole moment of the molecule. A linearly polarized trigger, therefore, selects a subsection of the molecules with transition dipole moments in said alignment. If the subsequent pulse arrives before dipole reorientation (via rotation, dipolar exchange, etc.), the trigger will modulate the transmission only for subsequent pulses with matching polarization. This behavior can be used to achieve polarization-selective modulation of an incoming pulse to, for example, shape the spectrum of separate polarization components of an ultrafast pulse for advanced transient spectroscopies.

Nanoscale Resonant Cavities

Although an embodiment of the optical resonator 20 includes parallel mirrors 90, 92 forming a Fabry-Perot etalon cavity 80, one of ordinary skill in the art will readily appreciate that strong coupling can also be achieved by coupling a material excitation to other standard optical resonators, including standard sub-wavelength particles or structures, such as discussed in AUTORE ET AL., Boron Nitride Nanoresonators for Phonon-Enhanced Molecular Vibrational Spectroscopy at the Strong Coupling Limit, Light: Science & Applications, 11 Dec. 2017, pp. 1-8, Vol. 7, No. 17172, Springer Nature, Heidelberg, Germany, incorporated herein by reference. For example, an alternative optical resonator includes standard metal strips, which support transverse plasmonic resonances. Such standard metal strips, for instance, includes gold strips. As another example, an alternative embodiment of the invention includes a standard, so-called extraordinary transmission grid formed with a phonon polariton supporting material. Such a grid, for instance, includes a square hole array formed in a material supporting surface phonon polaritons ("a SPhP material"), as well as a molecular layer with resonant absorptions on top of or underneath nanostructured optical resonators. An example of such a SPhP material is SiC. In both cases, it may be possible to achieve strong coupling with an overcoat molecular layer. Using such "open" structures also adds some advantages. Exposure to the environment could enable atmospheric sensing where reduction/oxidation reactions due to the presence of an atmospheric contaminant would alter coupling strength (similar to the electrochemical switching described above).

Although a particular feature of the disclosure may have been illustrated and/or described with respect to only one of several implementations, such a feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
an optical limiter comprising an optical resonator comprising an optical mode, a cavity length, and a saturable optically absorbent material located spatially within the optical mode, said saturable optically absorbent material comprising a refractive index,
wherein said optical resonator supports a plurality of resonant transmission peaks at resonant frequencies defined by the cavity length and the refractive index,
wherein said saturable optically absorbent material comprises a fundamental absorption peak located spectrally at a fundamental absorption peak frequency of the plurality of resonant transmission peaks,
wherein said saturable optically absorbent material comprises an absorptivity sufficient for strong cavity coupling, such that the fundamental absorption peak splits into a first upper vibration polariton transmission peak and a second lower polariton transmission peak separated by a Rabi splitting, the Rabi splitting being proportional to a square root of the absorptivity,
wherein the absorptivity varies with optical excitation of said optically absorbent material, the absorptivity being maximized at a photon-unsaturated ground state, the absorptivity being minimized at an optically excited state.

2. The apparatus according to claim 1, further comprising:
a modulator comprising said optical limiter and a light source in optical communication with said optical limiter and configured to transmit an optical signal, said light source and said optical limiter cooperating to alter the Rabi-splitting, thereby to alter frequencies of the first upper vibration polariton transmission peak and the second lower polariton transmission peak.

3. The apparatus according to claim 1, further comprising:
a nonlinear tunable filter comprising said optical limiter and is configured to modify the Rabi-splitting.

4. The apparatus according to claim 1, wherein said optical resonator comprises one of an etalon optical cavity, a nanofabricated resonator, a plurality of metallic spheres, a plurality of nanostructures, a whispering gallery resonator, and a structured surface phonon polariton.

5. The apparatus according to claim 1, further comprising:
a switch comprising said optical limiter to shift one of the two resonant transmission frequency peaks, thereby affecting the transmission of a signal beam.

6. The apparatus according to claim 1, wherein said fundamental absorption peak is located in an infrared regime,
wherein said saturable optically absorbent material comprises an infrared saturable optically absorbent material.

7. A method comprising:
limiting an optical intensity of a transmitted optical signal from an optical source using an optical resonator, the optical resonator comprising an optical mode, a cavity length, and an optical limiter located spatially within the optical mode, the optical limiter comprising a saturable optically absorbent material,
wherein the optical resonator supports a plurality of resonant transmission peaks at resonant frequencies defined by the cavity length,
wherein the saturable optically absorbent material comprises a fundamental absorption peak located spectrally at a fundamental absorption peak frequency of the plurality of resonant transmission peaks,
wherein the saturable optically absorbent material comprises an absorptivity sufficient for strong cavity coupling,
wherein the absorptivity varies with optical excitation of the optically absorbent material, the absorptivity being maximized at a photon-unsaturated ground state, the absorptivity being minimized at an optically excited state.

8. The method according to claim 7, wherein said limiting an optical intensity of a transmitted optical signal from an optical source using an optical resonator comprises:
Rabi-splitting the fundamental absorption peak into a first upper vibration polariton transmission peak and a second lower polariton transmission peak, the Rabi splitting being proportional to a square root of the absorptivity, the first upper vibration polariton transmission peak being located above the fundamental absorption peak and the second lower polariton transmission peak being located below the fundamental absorption peak.

9. The method according to claim 7, further comprising:
shifting upper vibration and lower vibration polariton spectral positions by changing the absorptivity.

10. The method according to claim 9, wherein said shifting the upper vibration and lower vibration polariton spectral positions by changing the absorptivity of the optically absorbent material comprises one of; optically exciting the optically absorbent material:
applying a voltage bias to the optically absorbent material: adjusting the absorbing material concentration by flowing a solution into the cavity that has. a desired concentration.

11. The method according to claim 7, wherein the optical signal comprises a broadband signal, the broadband signal comprising a bandwidth spanning the first upper vibration polariton transmission peak and the second lower polariton transmission peak,
wherein said limiting the optical intensity of an optical signal from an optical source using an optical limiter comprises one of:
increasing an optical intensity of the optical signal so as to shift upper vibration and lower vibration polariton resonances toward the fundamental absorption energy located in between the first upper vibration polariton transmission peak and the second lower polariton transmission peak; and
decreasing the optical intensity so as to shift the upper vibration and lower vibration polariton frequencies away from the fundamental absorption energy located in between the first upper vibration polariton transmission peak and the second lower polariton transmission peak.

12. The method according to claim 7, wherein the optical signal comprises a narrowband signal, the narrowband signal comprising an optical source at a frequency that corresponds to either the initial upper or lower polariton resonant transmission peak frequency,
  wherein said limiting the optical intensity of an optical signal from an optical source using an optical limiter comprises one of:
  passing the optical signal, when the optical intensity is below a saturation fluence of the optically absorbent material; and
  blocking the optical signal, when the optical intensity is above the saturation fluence of the optically absorbent material.

13. The method according to claim 7, wherein the optical signal comprises a linearly polarized optical signal,
  wherein said limiting the optical intensity of an optical signal from an optical source using an optical limiter comprises:
  modulating light with a same linear polarization as the linearly polarized optical signal; and
  not modulating the light with linear polarization orthogonal to the linearly polarized optical signal.

* * * * *